G. F. HULLINGS.
RECEPTACLE.
APPLICATION FILED AUG. 11, 1913.
1,195,358.
Patented Aug. 22, 1916.
3 SHEETS—SHEET 1.
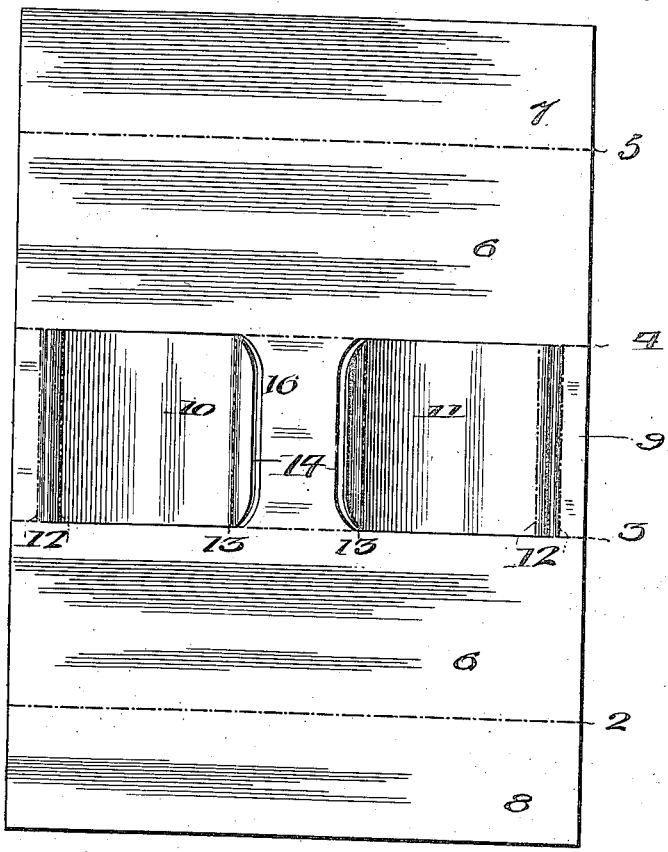
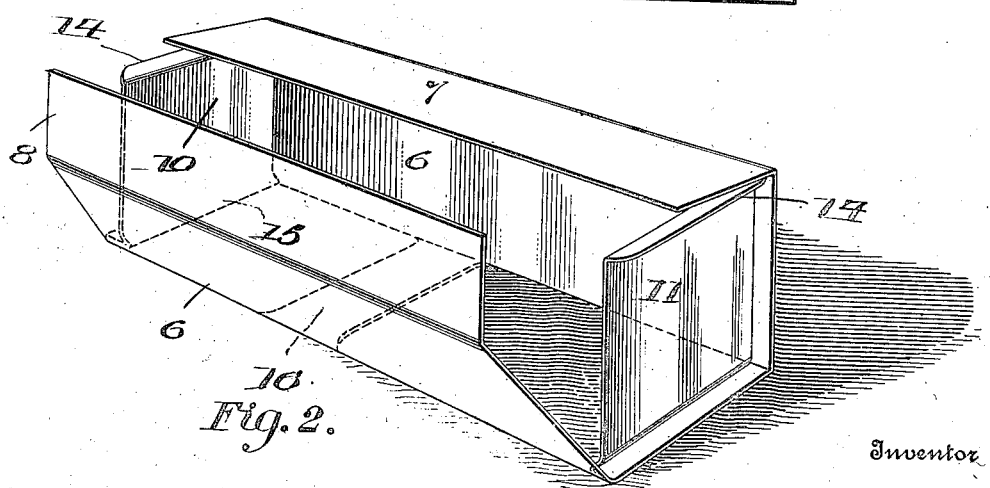
Witnesses
Philip E. Barnes
E. H. Parry
Inventor
George F. Hullings
By Frank A. Kane
Attorney G. F. HULLINGS.
RECEPTACLE.
APPLICATION FILED AUG. 11, 1913.
1,195,358.
Patented Aug. 22, 1916.
3 SHEETS—SHEET 2.
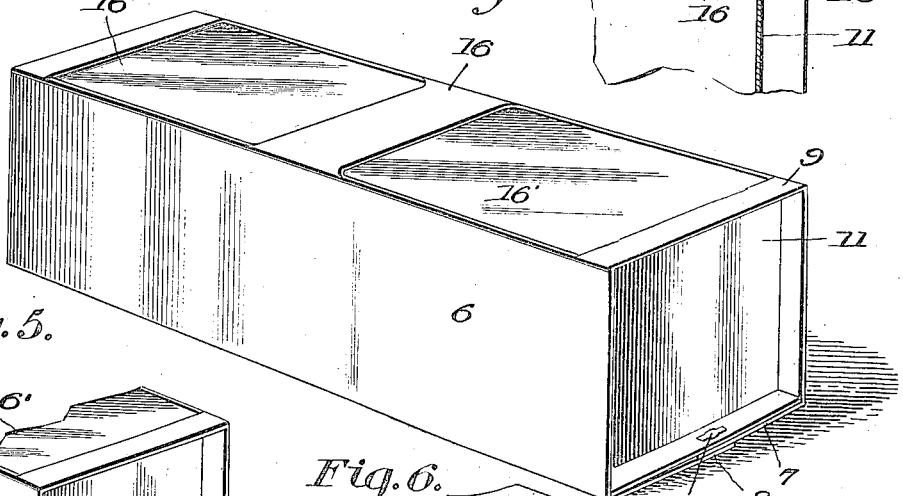
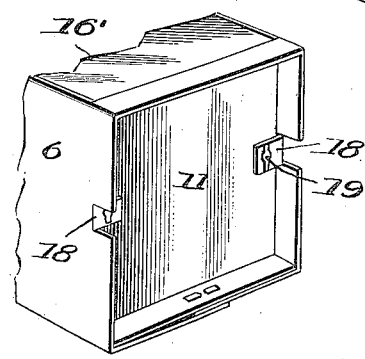
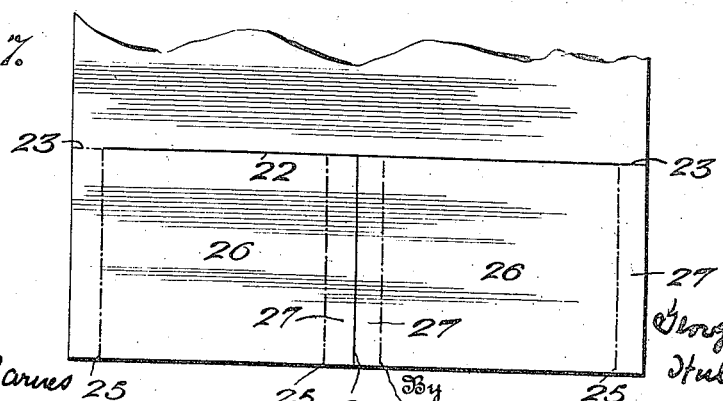
Witnesses
Philip E. Barnes
E. H. Parry
Inventor
George F. Hullings
By Frank A. Kane Attorney

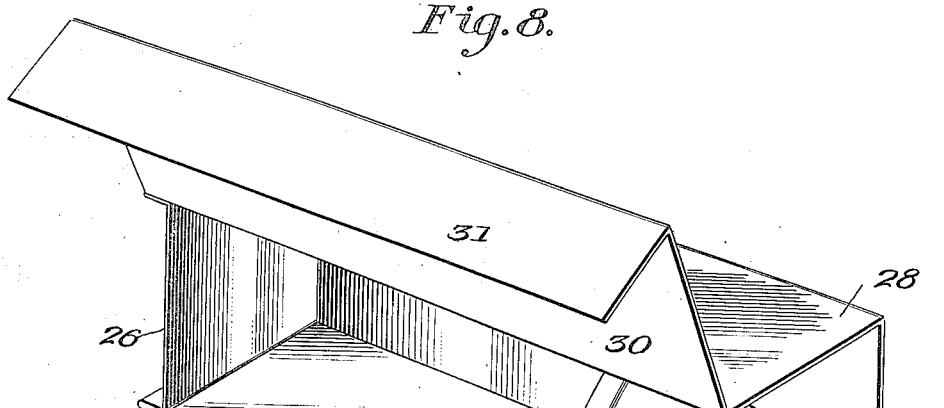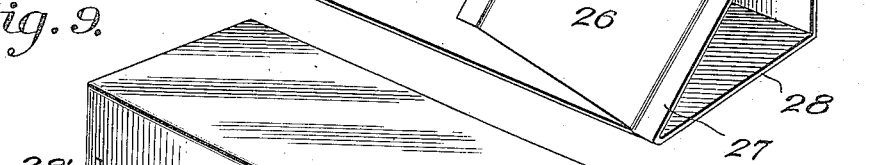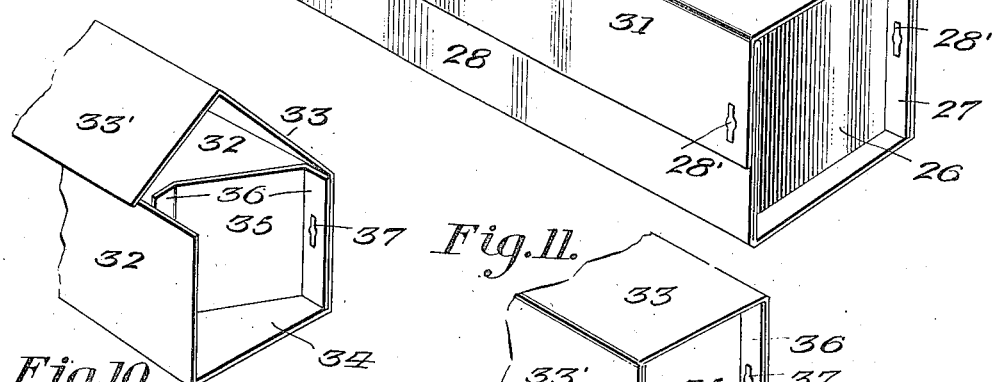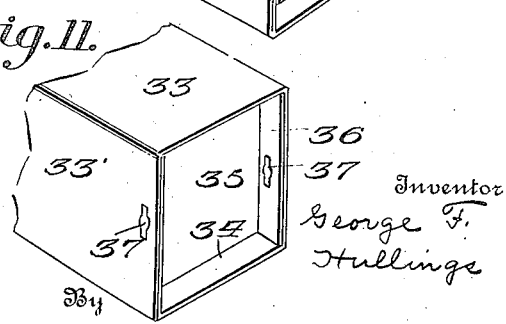

UNITED STATES PATENT OFFICE.

GEORGE F. HULLINGS, OF WASHINGTON, DISTRICT OF COLUMBIA, ASSIGNOR TO DAVID PELTON MOORE, OF WASHINGTON, DISTRICT OF COLUMBIA.

RECEPTACLE.

1,195,358.      Specification of Letters Patent.     Patented Aug. 22, 1916.

Application filed August 11, 1913. Serial No. 784,228.

*To all whom it may concern:*

Be it known that I, GEORGE F. HULLINGS, a citizen of the United States, residing at Washington, in the District of Columbia, have invented certain new and useful Improvements in Receptacles, of which the following is a specification, reference being had therein to the accompanying drawings.

My invention relates to improvements in receptacles, and while it may be embodied in constructions adapted for various purposes, it is particularly applicable to foldable blank boxes, baskets, and like containers.

An object of the present invention is the formation of a receptacle from a blank which may be cut without waste of the material used, readily folded and assembled, and secured in a manner which will prevent access to the contents without the destruction or mutilation of the receptacle.

A further object is the production of a device of this character which will be neat, sanitary, practical, economical of manufacture and specially adapted for use where the display of the commodities inclosed therein is a desideratum.

Other objects and advantages will in part be obvious and in part be made clear in the following description.

In the accompanying drawings, forming a part hereof, are illustrated several embodiments of my invention selected for facility of illustration, the same serving in conjunction with the description to explain its general principles, and wherein:—

Figure 1 is a plan view of a form of blank utilized in an embodiment of my invention; Fig. 2 is a view in perspective showing the blank partly folded; Fig. 3 is a similar view showing the blank assembled and secured; Fig. 4 is a fragmentary detail view of a portion of the receptacle, partly in section; Fig. 5 is a fragmentary view in perspective of a modified form of securing means; Fig. 6 is a similar view showing a means for providing the receptacle with extra covering; Fig. 7 is a fragmentary plan view of another form of blank comprising my invention; Fig. 8 is a view in perspective showing the same partially folded; Fig. 9 is a similar view of the same assembled; and Figs. 10 and 11 are detail fragmentary views of another embodiment partially and completely assembled.

A receptacle constructed in accordance with the embodiment of my invention illustrated in Figs. 1, 2, 3, and 4 consists preferably of a single blank, its size and shape being determined by the size and shape desired in the finished receptacle. It is formed with a view of eliminating waste cuttings from its outer edges as is generally done in the formation of end flaps and securing means for this class of containers, and has its end portions cut or stamped from the body portion of the blank in such a manner that the continuity of the edges thereof is not disturbed.

Scorings or markings across the surface of the blank are spaced relatively in accordance with the width and depth of container desired, and when folded along these lines, side, top and bottom portions of the receptacle are formed. When used for display purposes the end portions are preferably stamped from the top portion and folded back therefrom until brought into engagement with the bottom portions to which they are secured. As with the sides, the size and shape of the end portions will vary with the width and depth of the finished receptacle.

Different embodiments of the idea are shown in the various views, a means of affording additional security for the end portions being illustrated in Fig. 5, while an additional covering such as a slidable folder is shown in Fig. 6.

The embodiment illustrated in Figs. 7, 8, and 9, contemplates the stamping of the end portions from the extremity of the blank instead of from the top section, and a further modification showing another means for retaining and securing end portions is shown in Figs. 10 and 11.

Referring now specifically to the drawings, in which like characters designate like parts in the specification, the numeral 1 represents a blank comprising an embodiment of my invention. Its shape will vary according to the size of container desired, but it is here for convenience, shown as rectangular.

The blank is scored or marked along its length on lines 2, 3, 4, and 5, spaced relatively in accordance with the depth and width to be attained for the completed receptacle, and when folded on these lines forms, as best seen in Fig. 2, sides 6, 6, a bottom preferably comprising two sections 7 and 8, and a top section 9. The top section has cut or stamped therein flaps 10 and 11 to form the end sections. These flaps are scored or marked transversely on lines 12, 12, and 13, 13, and when folded thereon as in Fig. 2, form lips 14, 14, and ridges 15, 15.

It will be understood that the end flaps are cut preferably of a size to completely fill the space between the side, top and bottom sections when the blank is assembled as shown, and when so cut a central strip 16 is left. This central strip acts as a brace or reinforcement for the sides, and in conjunction with the ridges 15, as a retainer for an insert 16'. The insert may or may not be used but when found desirable it may be secured to the ridges and central strip, or merely disposed thereon and retained in place by the contents. When display is desired it may be of glass, transparent paper or the like, and may be readily inserted when the blank is in the form shown in Fig. 2. The contents having been placed thereon the bottom sections are folded over the lips 14 on the end sections and secured thereto in any desirable manner. A staple 17 is here shown and is my preferred form, as it renders the contents inaccessible without the mutilation or destruction of the box.

In Fig. 5, a means of providing additional security for the side and end portions is shown. This may be desirable when containers of large size are used, and it contemplates the cutting of lip sections 18 from the sides. These are folded back into engagement with the end sections and secured thereto as by staples 19.

In Fig. 6, I have shown the container just described provided with an additional covering. It comprises a blank 20 folded to follow closely the contour of the receptacle and end portions 21 thereof preferably overlapping at the point where the bottom sections of the receptacle are joined to the lip 14. It may be secured thereto by the same staple which secures the sections of the receptacle, or by using separate securing means may be used as a slidable cover for the container.

In Figs. 7, 8, and 9 an embodiment is shown in which provision is made for cutting the end flaps from the extremity of the blank instead of from what in the previous structure constituted the top of the container. In this form, the extremity of the blank is cut along a line 22, preferably at a a distance from the edge of the blank commensurate with the depth of the receptacle to be formed, and the continuation of this line, from its outer extremities to the sides of the blank is scored or marked as at 23 to facilitate in folding. A transverse cut 24 connecting the cut 22 with the outer extremity of the blank, and scored or marked lines 25 form flaps 26 and lips 27 which constitute the ends of the assembled container.

The remainder of the blank is folded along lines spaced relatively to form sides 28, a bottom 29, and, if desirable, a top 30. In assembling the receptacle, the end flaps 26 are folded along the scored lines 23 and 25 so that the lips 27 are encompassed by the sides 28 to which they are secured as by staples 28'.

As above stated, a top portion is not essential to this structure, but should it be desirable to have one and to make the container inaccessible without mutilation, an extension 31 of said top portion is carried over the side and may be secured by the same staple which is used to secure the side and end portions.

A receptacle constructed in accordance with the embodiment shown in Figs. 10 and 11 consists of a blank folded along lines spaced relatively to form sides 32, top 33, and bottom 34. End insert flaps 35 scored or marked so as to form when bent back, lips 36, are secured to one of the sides as by a staple 37. To assemble it is only necessary to bring the other lip into engagement with the other side as shown in Fig. 11, when an extended portion 33' of the top is folded down thereon and secured thereto in any convenient manner, a staple 37 being here illustrated.

From the foregoing it will be apparent that I have devised a structure which is neat, practical, economical of manufacture, and which fulfils the objects of my invention. But while I have shown the invention in the embodiments herein disclosed, it will be understood that I do not desire to limit myself to the precise construction shown, nor to any particular method or manner by which the same may be carried into effect, as many changes in the construction and arrangement of parts may be made without departing from the spirit of the invention, or sacrificing any of its chief advantages.

What I claim and desire to secure by Letters Patent is:—

1. A receptacle formed from a blank having continuous edges and foldable along lines spaced relatively to form an open ended container; end sections forming a portion of said blank and foldable outwardly therefrom to form closures for the open ends; and means for securing the end sections in closed position.

2. A receptacle formed from a blank having continuous edges and foldable to form an open ended container; end sections cut from a portion of said blank and foldable outwardly therefrom to form closures for the open ends; and means for securing said end sections to a portion of said blank when folded thereon.

3. A receptacle formed from a blank having continuous edges and foldable along lines spaced relatively to form top, bottom, and side sections; end portions forming a part of certain of said sections and foldable outwardly therefrom; and means for securing said end portions to certain of said sections when folded thereon.

4. A receptacle formed from a blank having continuous edges and foldable along lines spaced relatively to form top, side and bottom sections; end portions cut from certain of said sections and foldable outwardly therefrom to form end closures; and means for securing said end closures to certain of said sections when encompassed thereby.

5. A receptacle formed from a blank having continuous edges and foldable along lines spaced relatively to form top, side and bottom sections; end portions cut from said top section and foldable outwardly therefrom to form end closures; a side bracing element forming a portion of said top section and joining said side sections; and means for securing said end closures to certain of said sections.

6. A receptacle formed from a blank having continuous edges and foldable along lines spaced relatively to form top, side and bottom sections; end portions cut from said top section and foldable outwardly therefrom to form end closures; a bracing element forming a portion of said top section and joining said side sections; an insert element disposed on said top section; and means for securing said end closures to said sections when encompassed thereby.

7. A receptacle formed from a blank foldable along lines spaced relatively to form top, side and bottom sections; end portions cut from said top section and foldable outwardly therefrom to form end closures; said end sections being foldable along lines spaced relatively to form extended lip elements at their outer portions, and an insert retaining ridge at their inner portions; a bracing element forming a portion of said top section and joining said side sections; an insert element maintained in position by said bracing element and ridges; and means for securing said end closures to certain of said sections when folded thereon.

8. A receptacle formed from a blank foldable along lines spaced relatively to form top, bottom and side sections; end portions forming a part of certain of said sections and foldable outwardly therefrom to form end closures; lip elements formed on said end portions and foldable into engagement with certain of said sections; and means for securing said lip elements to certain of said sections when folded into engagement therewith.

9. A receptacle formed from a blank having continuous edges and foldable along lines spaced relatively to form top, side and bottom sections; end portions cut from one of said sections and foldable outwardly therefrom to form end closures; lip elements formed on said end portions and foldable into engagement with certain of said sections; and means for securing said lip elements to certain of said sections when folded into engagement therewith.

10. A receptacle formed from a blank foldable along lines spaced relatively to form bottom, top, and side sections; end closures cut from said top section and foldable longitudinally of the blank into engagement with one of said sections; lip elements formed on said end sections; said end sections being foldable outwardly on one of said lip elements to bring said lip elements into engagement with said side sections; and means for securing said lip elements to said side sections when in engagement therewith.

11. A receptacle formed from a blank foldable along lines spaced relatively to form top, bottom and side sections; end closures cut from the top section and foldable outwardly therefrom; lip elements and insert retaining ridges formed on said end closures; a bracing strip forming a part of said top section and joining said side sections; an insert element disposed on said bracing element and said ridges; and means comprising a stapling element for securing said lips on said end closures with certain of said sections when said sections have been folded to encompass said end sections.

12. A receptacle formed from a blank foldable to form an open ended container; end sections forming a portion of the body of the blank and foldable outwardly therefrom to form closures for the end sections; and means comprising stapling elements for securing the end closures to the blank when folded thereon.

13. A receptacle formed from a blank foldable to form an open ended container; end closures forming a portion of the body of the blank and foldable outwardly therefrom; and means comprising stapling elements for securing said end closures to said blank when folded into engagement therewith.

14. A receptacle formed from a blank having continuous edges foldable along lines to form top, bottom, and side sections; a plurality of end flaps cut from one of said sections, and scored transversely to form lip members on the extremities of the end flaps when folded; and means for securing said lip members to certain of said sections when assembled to form a closure.

15. A receptacle forming blank having continuous edges scored along lines to form top, bottom, and side sections; portions of one of said sections cut to form end closures; and transversely scored portions of said end closures forming securing lip members.

16. A receptacle forming blank comprising a member having continuous edges and scored along lines to form top, bottom and side sections; end portions formed by cutting one of said sections transversely; and scored portions of said ends forming lip elements adapted to be secured to certain of said sections when assembled to form a closure.

17. A receptacle forming blank comprising a member having continuous edges and scored along lines to form top, bottom and side sections; end portions cut from a section leaving a central bracing strip; and scored portions of said ends forming lip members and insert retaining ridges.

18. A receptacle forming blank comprising a member scored along lines to form top, bottom and side sections; end closing members formed by cutting a section transversely; and lip members formed on said end closing members by scoring them at their outer edges.

In testimony whereof I affix my signature in the presence of two subscribing witnesses.

GEORGE F. HULLINGS.

Witnesses:
E. H. PARKINS,
E. H. PARRY.